(12) United States Patent
Shimizu et al.

(10) Patent No.: US 6,901,198 B2
(45) Date of Patent: May 31, 2005

(54) POLYMER OPTICAL WAVEGUIDE AND PROCESS FOR PRODUCING THE SAME

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 17 days.

(21) Appl. No.: 10/409,151

(22) Filed: Apr. 9, 2003

(65) Prior Publication Data

US 2004/0057689 A1 Mar. 25, 2004

(30) Foreign Application Priority Data

Sep. 20, 2002 (JP) ........................................ 2002-276029

(51) Int. Cl.[7] ................................................ G02B 6/10
(52) U.S. Cl. ........................ 385/129; 385/130; 385/132
(58) Field of Search ............................... 385/129–132; 264/1.24; 65/386

(56) References Cited

U.S. PATENT DOCUMENTS

| | | | | |
|---|---|---|---|---|
| 4,884,434 A | * | 12/1989 | Satake et al. | ..................... 73/7 |
| 5,716,556 A | | 2/1998 | Heard | |
| 5,949,945 A | * | 9/1999 | Okano et al. | ............... 385/132 |
| 6,314,228 B1 | * | 11/2001 | Korenaga et al. | ........... 385/129 |
| 6,355,198 B1 | | 3/2002 | Kim et al. | |
| 2002/0114556 A1 | * | 8/2002 | Kato et al. | ..................... 385/16 |

FOREIGN PATENT DOCUMENTS

JP       B2 3151364      1/2001

OTHER PUBLICATIONS

Whitesides et al., "The Art of Building Small", Scientific American, pp. 39–47, 2001.

Xia et al., "Soft Lithography", Annu. Rev. Mater. Sci., pp. 153–184, 1998.

* cited by examiner

*Primary Examiner*—Leonidas Boutsikaris
(74) *Attorney, Agent, or Firm*—Oliff & Berridge, PLC

(57) ABSTRACT

A process for producing at least one polymer optical waveguide wherein each of at least one polymer optical waveguide has at least one start point and at least one end point uniformly aligned along a same single straight line. The process includes preparing a mold having at least one concave portion for forming at least one core; bringing a cladding substrate into close contact with the mold disposing the at least one concave portion towards the cladding substrate; filling the at least one concave portion of the mold with a core-forming curable resin; curing the core-forming curable resin in the at least one concave portion to form at least one core; and cutting a cladding substrate possessing at least one core part and a cladding layer thereon along the same single straight line.

20 Claims, 5 Drawing Sheets

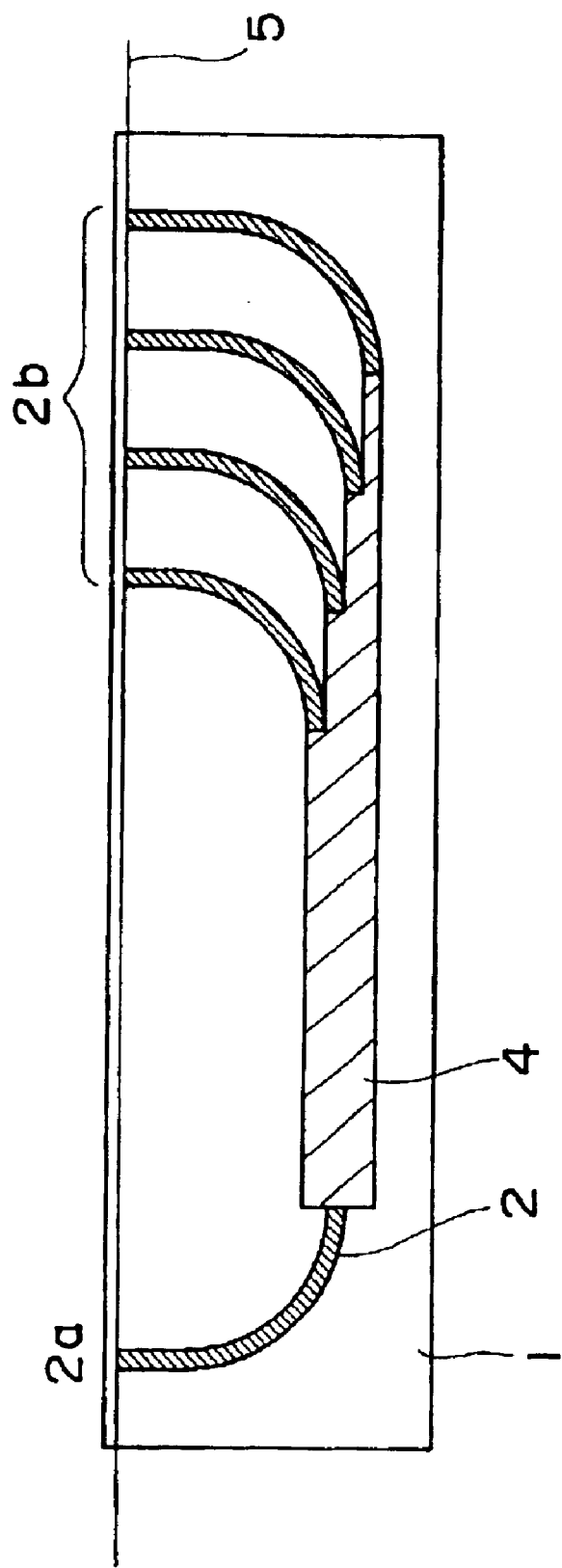

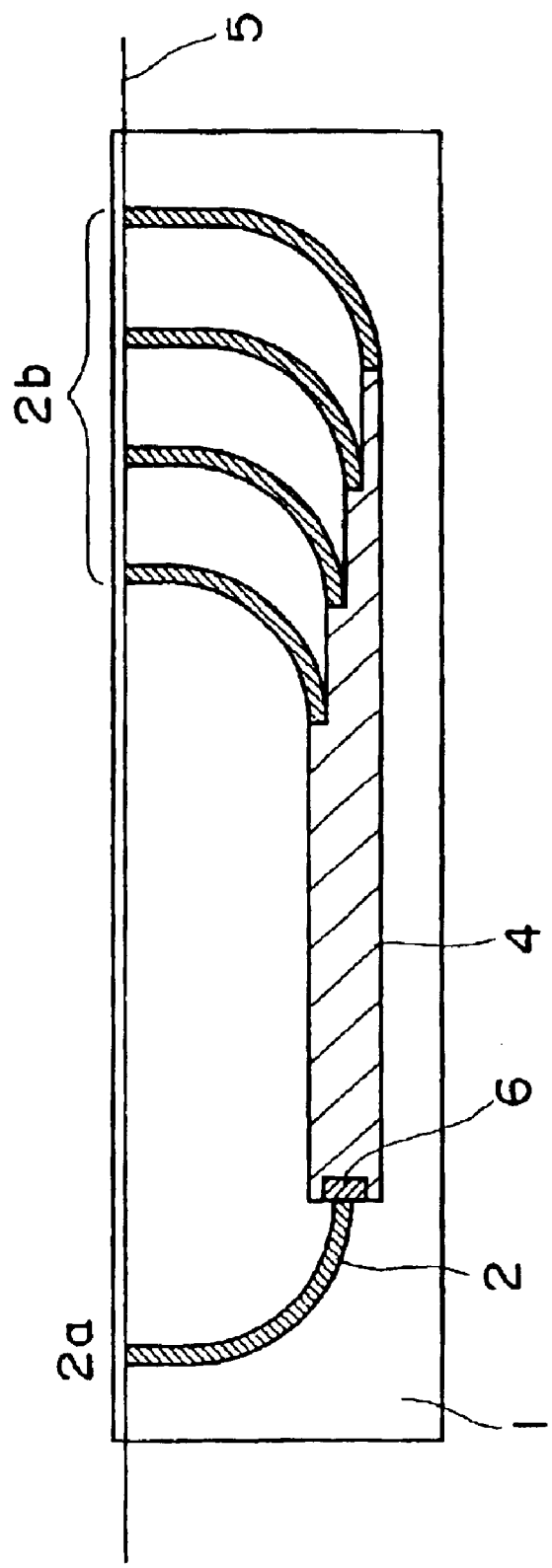

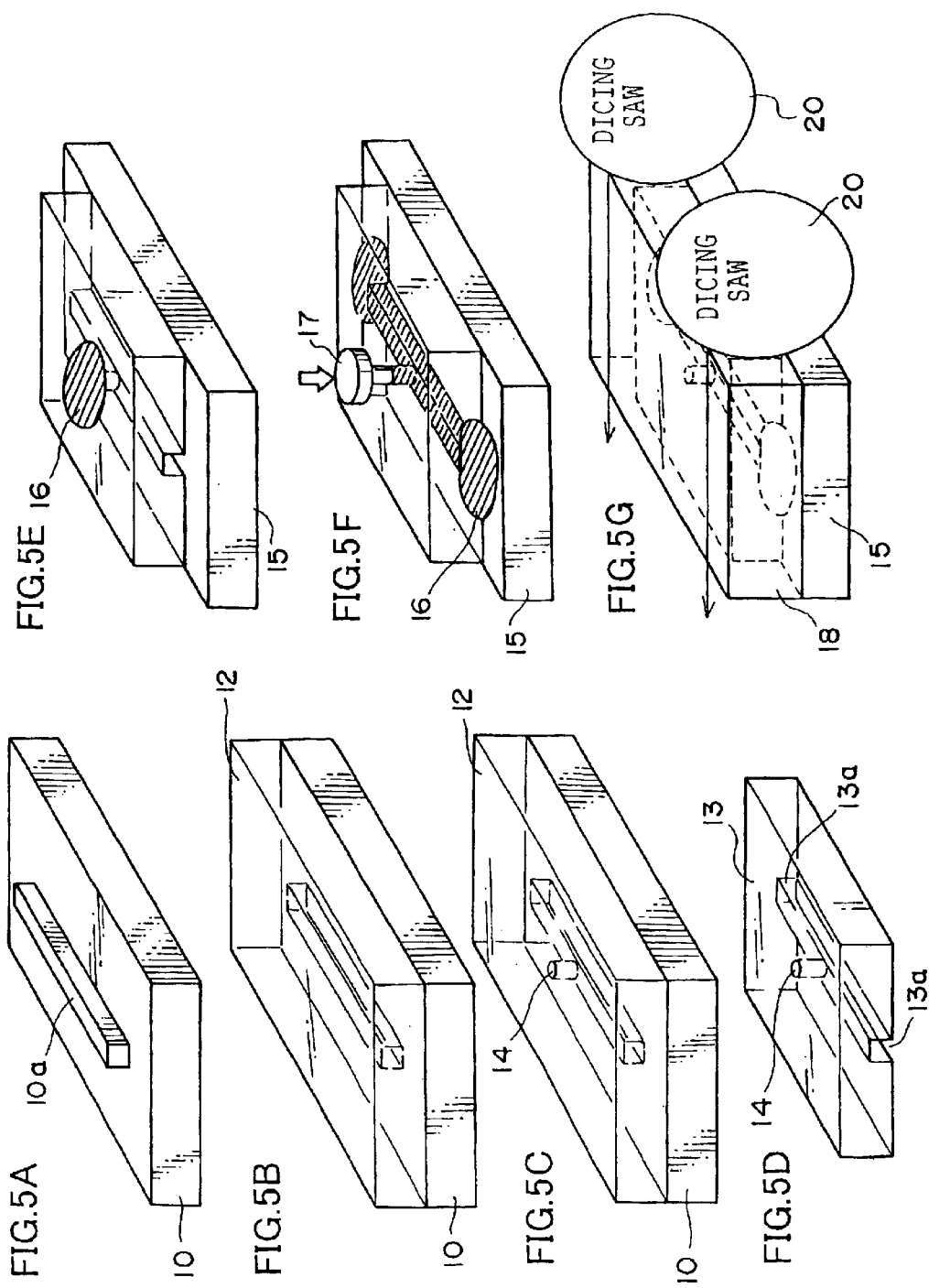

POLYMER OPTICAL WAVEGUIDE AND PROCESS FOR PRODUCING THE SAME

BACKGROUND OF THE INVENTION

1. Field of the Invention

The present invention relates to an optical waveguide, in particular, a flexible polymer optical waveguide, and also relates to a process for producing the polymer optical waveguide at low cost.

2. Description of the Related Art

Various kinds of processes for producing a polymer optical waveguide have been proposed, including: (1) a process in which films are impregnated with a monomer, a core portion is selectively exposed to light to alter a refractive index and then the films are stuck together (a selective polymerization process), (2) a process in which a core layer and a cladding layer are formed by coating, followed by application of reactive ion etching to form a clad portion (RIE method), (3) a process in which an ultraviolet ray-curable resin as a polymer material added with a photosensitive material thereto is exposed and developed using a photolithographic technique (a direct exposure method), (4) a process using injection molding, (5) a process in which a core layer and a cladding layer are formed by coating, followed by exposure of the core portion to light to thereby alter a refractive index thereof (a photobleaching process) and others.

Problems to be solved still remain, however, in the above respective processes, as follows: The selective polymerization process (1) is problematic in lamination of the films, the processes (2) and (3) are costly since a photolithographic technique is adopted, the process (4) has a problem in precision of an obtained core diameter and the process (5) has a problem of providing no sufficient difference in refractive index between the core and cladding layers.

While processes excellent in performance and practical in use are currently limited to the processes (2) and (3), each has a cost problem to be solved. Furthermore, neither of the methods (1) and (5) is suitable for formation of a polymer optical waveguide in a flexible plastic substrate with a large area.

As a process for producing a polymer optical waveguide, a process is known in which a patterned substrate (cladding layer) in which a pattern of grooves functioning as capillaries is formed is filled with a polymer precursor material for a core, the polymer precursor material is thereafter cured to form a core layer, and then, a planar substrate (cladding layer) are stuck thereon. According to this process, however, not only the capillary grooves but also the entirety of a clearance between the patterned substrate and the planar substrate are filled with the polymer precursor material, and the polymer precursor material is cured thereby forming a thin layer having the same composition as the core layer. As a result a problem arises in that light is leaked out through the thin layer.

As one method of solving this problem, David Heard has proposed a process for producing a polymer optical waveguide, which comprises joining a pattern substrate on which a pattern of grooves to be capillaries is formed and a planar plate with a clamping jig, and evacuating them to fill capillaries with a monomer solution (for example, see Specification of Japanese Patent No. 3151364).

However, in this process, unless a planar plate is joined using a clamp, other areas are undesirably immersed in monomer solution as well as the core part, hence a precise waveguide structure cannot be formed, being a troublesome process. In addition, this process also has a defect that, when a monomer solution is polymerized to obtain a polymer (solidification), volumetric change occurs, which changes the shape of a core. In addition, the process also has a defect that a polymer obtained by polymerizing a monomer solution and capillaries are partially adhered at removal of capillaries and, therefore, a core shape is destructed.

Furthermore, recently, George M. Whitesides and his colleagues of Harvard University advocate a technique called capillary micromolding as a new technique fabricating a nonostructure and as one example of a soft lithography. This is a process in which a master substrate is fabricated using a photolithographic technique, a nanostructure on the master substrate is imprinted on a polydimethyl siloxane (PDMS) mold using adhesiveness and good peelability of PDMS and a liquid polymer is caused to flow into the mold with the help of capillarity and then hardened. A detailed commentary on the process is described in Scientific American, September, 2001 issue (Nikkei Science (Japanese Periodical) December, 2001 issue).

The technique was filed as a patent application concerning a capillary micromolding method by Kim Enoch et al.: members of a group led by George M. Whitesides of Harvard University (see Specification of U.S. Pat. No. 6,355,198).

Even if a process described in the U.S. patent is applied to the producing of a polymer optical waveguide, it takes a long time to form a core portion, disabling application to mass production because of a small area of the core portion of an optical waveguide. Furthermore, in the course of polymerization of a monomer solution to form a polymer, a change in volume occurs and a shape of the core is deformed, leading to a fault of a large transmission loss (waveguiding loss).

SUMMARY OF THE INVENTION

An objective of the present invention is to solve the aforementioned problems of the prior art.

That is, an objective of the invention is to provide simple and cost-effective process for producing a polymer optical waveguide having minimum waveguiding loss.

The above objectives are attained by the following invention. Specifically, the invention relates to a process for producing a polymer optical waveguide having minimum waveguiding loss and insertion loss by maintaining a highly precise core shape by employing capillary phenomenon proposed by the present inventors and, in particular, a method of reducing operating steps has been found.

One aspect of the invention provides a process for producing a polymer optical waveguide wherein all of one or a plurality of start points and all of one or a plurality of end points of a waveguide are uniformly aligned along a same single straight line. The process comprises the steps of: preparing a mold comprising a concave portion for forming a core; bringing a cladding substrate into close contact with the mold disposing a concave portion toward the cladding substrate; filling the concave portion of the mold with a core-forming curable resin; curing the core-forming curable resin in the concave portion to form a core; and cutting a cladding substrate possessing a core part and a cladding layer thereon along the same straight line.

BRIEF DESCRIPTION OF THE DRAWINGS

FIG. 3 is a plane figure of a third example of the state before filling of a curable resin in the invention seen from an upper side of a mold.

FIG. 4 is a plane figure showing the state in which a diffusing plate is inserted into a mixing part, seen from an upper side of a mold.

FIGS. 5A to 5G are schematic views showing steps of producing a polymer optical waveguide of one embodiment.

DETAILED DESCRIPTION OF THE INVENTION

Figure 1:
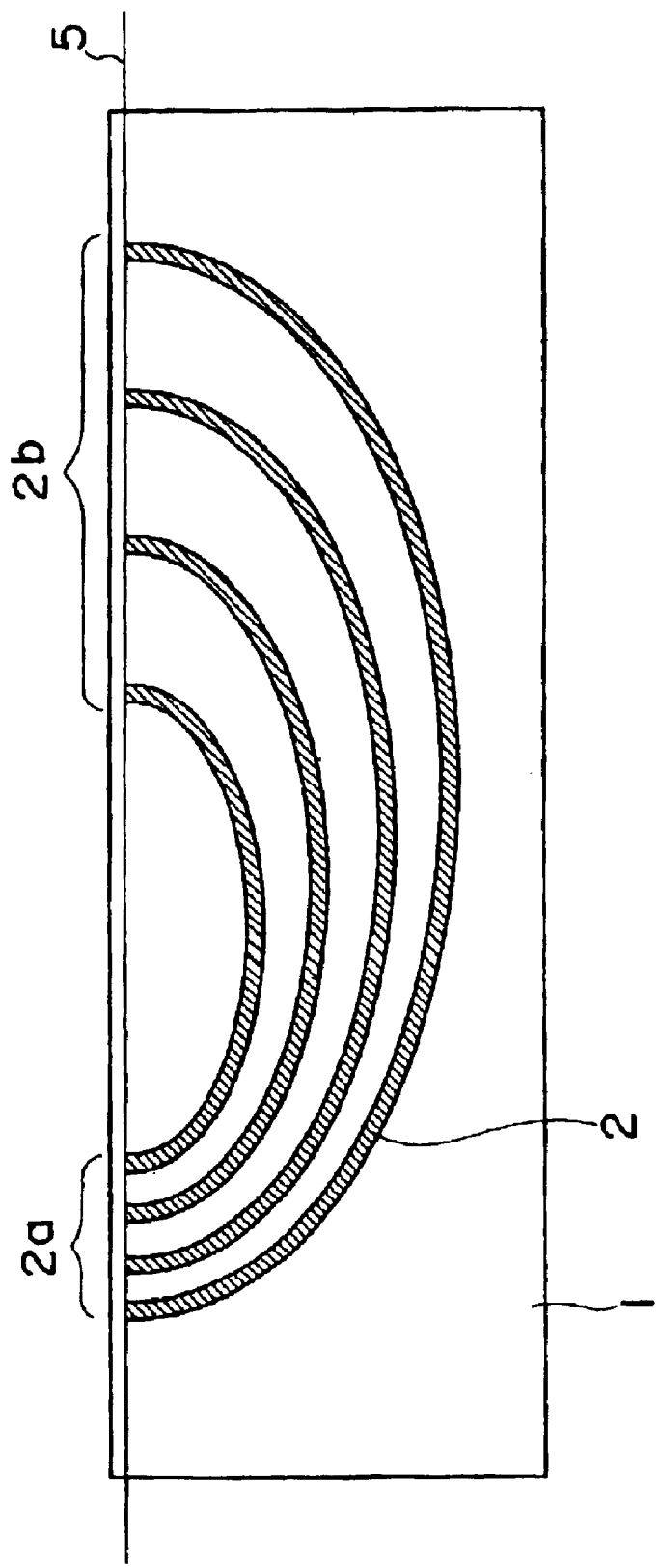
FIG. 1 is a plane figure of a first example of the state before filling of a curable resin in the present invention seen from an upper side of a mold.

The present invention will be explained in detail below.

A process for producing a polymer optical waveguide of the present invention is to form a polymer optical waveguide at low cost by utilizing a micromolding method using a mold elastomer, representative of which is polydimethylsiloxone (PDMS), to produce a mold having a high precision core shape by a simple method, utilizing the better adherability between a film or the like having a low refractive index which will be a cladding layer and a mold elastomer, to fill an ultraviolet ray curing or heat-curable resin only in a concave portion of a mold and solidify the resin, to form a core part, removing a mold and, thereafter, coating and solidifying a cladding layer.

In addition, since the aforementioned PDMS generally has a low refractive index of approximately 1.43, the PDMS mold can be also utilized as a cladding layer as is without being removed from a resin in a mold. In this case, it becomes necessary to design such that a mold of PDMS should not be stripped from the filled ultraviolet ray-curable resin or heat-curable resin and from a low refractive index film, which serves as a cladding substrate.

In the present invention, a flexible film substrate or a rigid substrate on which a core layer is formed on the surface thereof serves as a cladding layer. Only by forming a core layer (core part), which has a higher refractive index than that of the film or the substrate, on the surface of the flexible film or the rigid substrate, a polymer optical waveguide functions. Upon this, for forming a core part, a micromolding method using, as a mold, a mold elastomer, a representative of which is PDMS, is used. A mold elastomer is excellent in the adherability and a peelability with a substrate, and has the ability of replicating a nanostructure. Therefore, when adhered to a substrate, even ingression of a liquid can be prevented and, when a capillary is formed with a film substrate and a mold, a liquid is filled only into a capillary. In addition, since a PDMS mold also possesses excellent peelability, it can be easily removed even after adhering once. That is, when a resin is filled using PDMS as a mold and the resin is solidified, a mold can be removed from the resin while maintaining a shape at a high precision and, therefore, it is very effective as a method of forming a core part of an optical waveguide.

Regarding this process for producing a polymer optical waveguide, the invention is a process for producing a polymer optical waveguide wherein all of one or a plurality of start points and all of one or a plurality of end points of a waveguide are uniformly aligned along a same single straight line. The process comprises a step of forming a layer of a mold-forming elastomer on the surface of a master template having a convex portion corresponding to a core part, removing the layer having a concave portion corresponding to the convex portion and, then, forming a side of the layer along a line substantially following at a distance from the straight line so as to expose the concave portion formed in the layer, said concave portion corresponding to the convex portion, whereby, a mold is made; a step of bringing a cladding substrate having the excellent adhesion with the mold into close contact with the mold disposing a concave portion toward the cladding substrate; a step of introducing the curable resin into the concave portion of the mold by capillary phenomenon by contacting a curable resin with the exposed concave portion utilizing the exposed concave portion at a start point or at an end point as a resin inlet; a step of curing the introduced curable resin; and a step of cutting a cladding substrate possessing a core part and a cladding layer thereon at one time along the same straight line.

The present invention will be explained below following each step.

-Step of Forming a Mold-

For preparing a master template on which a convex portion corresponding to a core part is formed, the previous methods, for example, a photolithography method and the like can be used without limitation. Alternatively, a method of producing a polymer optical waveguide by an electrodeposition method or an optical electrodeposition method which has been already proposed by the present applicant can be also applied to preparation of a master template. As a material for the master template, a silicon plate and a glass substrate are used, and a size of the convex portion to be formed on a master template is appropriately determined depending on use of a polymer optical waveguide. For example, in the case of an optical waveguide for single mode, a core of approximately 10 $\mu$m square is generally used and, in the case of an optical waveguide for multiple mode, a core of approximately 50 to 100 $\mu$m square is generally used, but an optical waveguide having a further larger core part of approximately several hundreds $\mu$m is also utilized, depending on use.

Since a polymer optical waveguide produced by the invention has all of one or a plurality of start points and all of one or a plurality of end points of a waveguide along the same straight line, a shape of a convex portion corresponding to the core part is curved from a start point to an end point. When there are a plurality of start points, there may be a plurality of end points of a core part corresponding to the start points in some cases. In addition, some of core parts may be branched.

A mold is prepared by forming an elastomer layer for mold formation on a surface having a convex portion of a master template as prepared as described above, and removing it.

It is preferable that a material for a mold-forming elastomer can be easily removed from a master template, and has the predetermined or more mechanical strength and dimensional stability as a mold (to be used repeatedly). A layer of a mold-forming elastomer is formed of a mold-forming elastomer, or the elastomer to which various additives are added as necessary.

Since the mold-forming elastomer must accurately replicate the shapes of individual optical waveguides formed on a master template, it is preferable that the elastomer has a viscosity having a predetermined value, for example, in the range of approximately 2000 to 7000 mPa·s. In addition, for regulating a viscosity, a solvent can be added to such an extent that adverse influence due to a solvent is not exhibited.

In addition, the viscosity can be measured using a general rotating viscometer.

As a material for the mold-forming elastomer, curable silicone elastomers (heat-curing type, room temperature curing type, optical curing type) are preferably used from a viewpoint of the peelability, the mechanical strength and the dimensional stability.

A curable silicone elastomer used in the invention is a silicone elastomer having a three-dimensionally cross-linked structure. The silicone elastomer having a three-dimensionally cross-linked structure is usually polymerized from a polyfunctional (trifunctional, tetrafunctional) unit, and a cross-lined structure. In addition, an example of a curable silicone elastomer used in the invention includes a silicone rubber obtained by adding a vulcanized agent and polymerizing to a molecular weight (siloxane unit) of approximately 5000 to 10000 by heating and curing.

In the invention, the reasons why it is necessary to use the aforementioned curable silicone elastomer are as follows.

Since the curable silicone elastomer has the low surface energy due to —Si—O— bond, the elastomer essentially exhibits the excellent releasability and the non-compatibility. However, the excellent adhesion can be also realized by controlling the curing conditions and, thus, it becomes possible to obtain a mold having both the peelability and the adherability.

Examples of a factor dominating curing include a kind of a reacting group and the number of a reacting group of a component; a curing time, a temperature; the irradiation energy; and the like. Therefore, examples of a method of controlling the curing conditions include a method of adding monofunctional and difunctional polydimethylsiloxane and reaction controlling agents (acetylene alcohols, cyclic methylvinylsyclosiloxane, siloxane-modified acetylene alcohols, etc.), and a method of adjusting an amount of a catalyst, a reaction temperature, a reaction time, the light (UV) irradiation intensity and the like. When the curing conditions are controlled by these methods, since a molecular weight of a curable silicone elastomer, an amount of remaining silanol as a reacting group and the like can be regulated, it becomes possible to arbitrarily control the releasability, the hardness, the surface hardness, the adherability, the transparency, the thermal resistance, the chemical stability and the like.

Examples of the curable silicone elastomer include the following elastomers as heat-curable (condensation type, addition type) and photo-curable silicone elastomers.

Among the thermal curable silicone elastomer, examples of the condensation type curable silicone elastomer include curable silicone elastomers synthesized by blending polydimethylsiloxane having a silanol group at its terminal ends as a base polymer, and polymethylhydrogensiloxane as a cross-linking agent, and heat-condensing them in the presence of a catalyst such as a metal salt of an organic acid such as organic tin and amines; curable silicone elastomers synthesized by reacting polydiorganosilixane having a reactive functional group such as a hydroxyl group and an alkoxy group at its terminal ends; polysiloxane elastomers synthesized by hydrolyzing trifuncitonal or more chlorosilane, or a mixture of this and mono- or di-functional chlorosilane to obtain silanol, which is condensed; and the like.

Among thermal curable silicone elastomers, examples of addition type curable silicone elastomer include curable silicone elastomers synthesized by blending polydimethylsiloxane containing a vinyl group as a base polymer and polydimethylhydrogensiloxane as a cross-linking agent, and reacting and curing them in the presence of a platinum catalyst.

In addition, the addition curable silicone elastomers are classified into solvent type, emulsion type and non-solvent type from a viewpoint of a form and, in the invention, the non-solvent type is suitably used.

Examples of the photo-curable silicone elastomer include curable silicone elastomers synthesized by utilizing a photocationic catalyst, and curable silicone elastomers synthesized by utilizing the radical curing mechanism.

As the curable silicone elastomer, elastomers which are low-molecular liquid resins and have the desired sufficient permeability are preferably used. It is preferable that the viscosity of the curable silicone elastomer is in the range of 500 to 7000 mPa·s, and it is more preferably that the viscosity is in the range of 2000 to 5000 mPa·s.

As the curable silicone elastomer, elastomers containing a methylsiloxane group, an ethylsiloxane group or a phenylsiloxane group are preferable and, in particular, curable dimethylsiloxane elastomers are preferable.

In addition, it is preferable that the master template is subjected to releasing treatment such as releasing agent coating in advance, to promote being removed from a mold.

A layer of a mold-forming elastomer is formed by a method of coating or casting a material of a mold-forming elastomer on the surface having a convex portion of a master template and, thereafter, performing drying treatment and curing treatment are performed as necessary.

A thickness of a layer of a mold-forming elastomer is appropriately determined in view of the handling property as a mold, and is preferably in the range of 0.1 to 50 mm.

Thereafter, a layer of a mold-forming elastomer and a master template are separated to obtain a mold.

Then, a mold is prepared by means of cutting or punching a mold so as to expose a concave portion corresponding to the convex portion formed on the mold. Cutting and punching of a mold are performed so as to expose a concave portion because, in a later step, an ultraviolet ray-curable resin or a heat-curable resin is introduced into, and expelled from, a concave portion of the mold by capillary phenomenon by utilizing this exposed concave portion as a resin inlet and a resin outlet.

In the invention, as described later, since a cladding substrate, on which a core part and a cladding layer are formed, is finally cut along the aforementioned same straight line at one time, upon formation of a mold, it is necessary to cut or punch along a line substantially following at a distance from the straight line, said cutting or punching line being on the side opposite from the waveguide side. Specifically, it is preferable to cut or punch the mold along a line immediately after the concave portions (that is, the core part of waveguide) extend past said straight line, on which start points and end points are aligned.

In addition, as means for exposing the concave portion of the mold, a variety of means may be used in addition to a cutter and a puncher.

From a viewpoint of the adherability to a film substrate, the surface energy of the mold is preferably in the range of 10 to 30 mN/m, more preferably in the range of 15 to 24 mN/m. In addition, the value of the surface energy can be obtained by measuring a contact angle between a mold using various solvents having the known surface tension components.

From a viewpoint of the replicating ability and the peelability, the Shore rubber hardness of a mold is preferably in the range of 15 to 80°, more preferably in the range of 20 to 60°. The rubber hardness of a mold can be measured by using a durometer.

In addition, from a viewpoint of the replicating performance, the surface roughness of a mold (root-meansquare (RMS) roughness) is preferably 0.5 μm or smaller, more preferably 0.1 μm or smaller. The surface roughness of a mold can be measured by using a contact surface roughness measuring equipment (α step 500, manufactured by KLA-Tencor Corporation).

-Step of Adhering Mold and Cladding Substrate-

Since an optical waveguide produced by the invention can be also used as a coupler, optical wiring between boards and an optical multiplexer and the like, a material for the cladding substrate is selected in view of optical properties such as a refractive index, the light transmission and the like, the mechanical strength, the thermal resistance, the adherability to a mold, the flexibility and the like, depending on its use. In the invention, it is preferable to produce a polymer optical waveguide using a flexible film material and a rigid substrate.

In the invention, since there are accompanied introduction of a curable resin through a resin inlet described later, and pushing by a resin pushing member, in order to prevent unnecessary deformation thereto and improve the workability, it is desirable that a cladding substrate is a flat rigid substrate. In addition, when the cladding substrate is desired to be a flexible film substrate, the similar effect can be expected by supporting a back with a flat rigid body, for example, a glass substrate at a process of producing a waveguide.

From a viewpoint of a comparatively small refractive index and the transparency, examples of a film substrate to be used include an alicyclic acrylic film, an alicyclic olefin film, a cellulose triacetate film, a fluorine-containing resin a film and the like. In order to obtain the difference between the refractive index of a film substrate and that of a core part, the refractive index of a film substrate is preferably 1.55 or smaller, more preferably 1.53 or smaller.

In addition, the refractive index can be measured, for example, using an Abbe refractometer (measurement of a refractive index of other core part is the same).

As the alicyclic acrylic film, for example, OZ-1000 and OZ-1100 (manufactured by Hitachi Chemical Co., Ltd.) are used in which an aliphatic cyclic hydrocarbon such as tricyclodecane is introduced into an ester substituent.

In addition, the alicyclic olefin film is preferably used in the invention from a viewpoint of the transparency and a low refractive index, and examples thereof include those olefin films having a norborne structure in a main chain, and films having a norborne structure in a main chain and having a polar group such as an alkyloxycarbonyl group (alkyl group includes alkyl groups having a carbon number of 1 to 6 and cycloalkyl group) in a side chain. Inter alia, since the alicyclic olefin resin having a norborne structure in a main chain and having a polar group such as an alkyloxycarbonyl group in a side chain has the excellent optical properties such as a low refractive index (a refractive index is approximately 1.50 and, therefore, the difference between the refractive index of a core and that of a clad can be maintained) and high light transmission, has the excellent adherability to the mold, and has the excellent thermal resistance, the aliphatic olefin resin is particularly preferably used in a process for producing a polymer optical waveguide of the invention. Examples thereof include Arton film (manufactured by JSR Corp.) and Zenoa film (manufactured by Zeon Corporation).

A thickness of the film substrate is appropriately selected in view of the flexibility, the rigidity and the easy handling, and is preferably in the range of approximately 0.1 mm to 0.5 mm.

-Step of Introducing a Curable Resin into a Concave Portion of a Mold-

In this step, a curable resin which will be a core is contacted with a resin inlet, and the curable resin is introduced (filled) into a concave portion of the mold by capillary phenomenon. In the invention, specifically, the resin is filled by the following method.

First, any one of a start point side and an end point side formed so as to expose the concave portion is adopted as a resin inlet, and the other is adopted as a resin outlet, and a curable resin is introduced into a concave portion of a mold.

The resin outlet functions as an outlet for the air at an initial stage of penetration because a resin is not outputted all the time at a resin penetration step as described above. Therefore, when there are a plurality of non-branched waveguides, there is no problem. However, for example, when the end point side in a branched core (waveguide) shape is adopted as a resin inlet, since there are a plurality of end points, a curable resin reaches a branching portion earlier in any branched core part than in other branched core parts, whereby, penetration of a curable resin into other branched core parts is stopped in some cases. For this reason, in the case of a branched core shape, it is preferable that a start point side is adopted as a resin inlet.

The aforementioned method is an effective method when a length of a waveguide is in the range of approximately 5 to 10 cm. However, when a length is larger, there is a problem that filling of a curable resin requires a long time and the productivity is reduced. Then, there is considered a method of shortening a filling time by dividing a length of a waveguide. In this case, an outlet for the air and the resin corresponding to an inlet for the resin is required. And arrangement not deteriorating a waveguide shape becomes necessary in addition to an inlet and an outlet for a resin.

Then, in the invention, a resin injecting port (resin inlet) is formed in addition to the aforementioned both ends by penetrating the mold surface opposite to a mold surface adhered to a cladding substrate so that the inlet is communicated with the concave portion.

FIG. 1 is a view showing the status before provision of a penetrated port on a mold 1 seen from a mold side, in production of a plurality of waveguides from a non-branched core shape from a start point 2a to an end point 2b. Here, numerical reference 2 shows a core part, and numerical reference 5 shows a single straight line, along which all of one or a plurality of start points and all of one or a plurality of end points of a waveguide are uniformly aligned. In the invention, a resin inlet (penetrated port) is not limited to a hole shape provided for every waveguide. A resin inlet (penetrated port) may be communicated with a plurality of concave portions and have a shape open in a direction approximately orthogonal with a waveguide of a mold 1 like a resin inlet 3 in FIG. 2.

Figure 2:
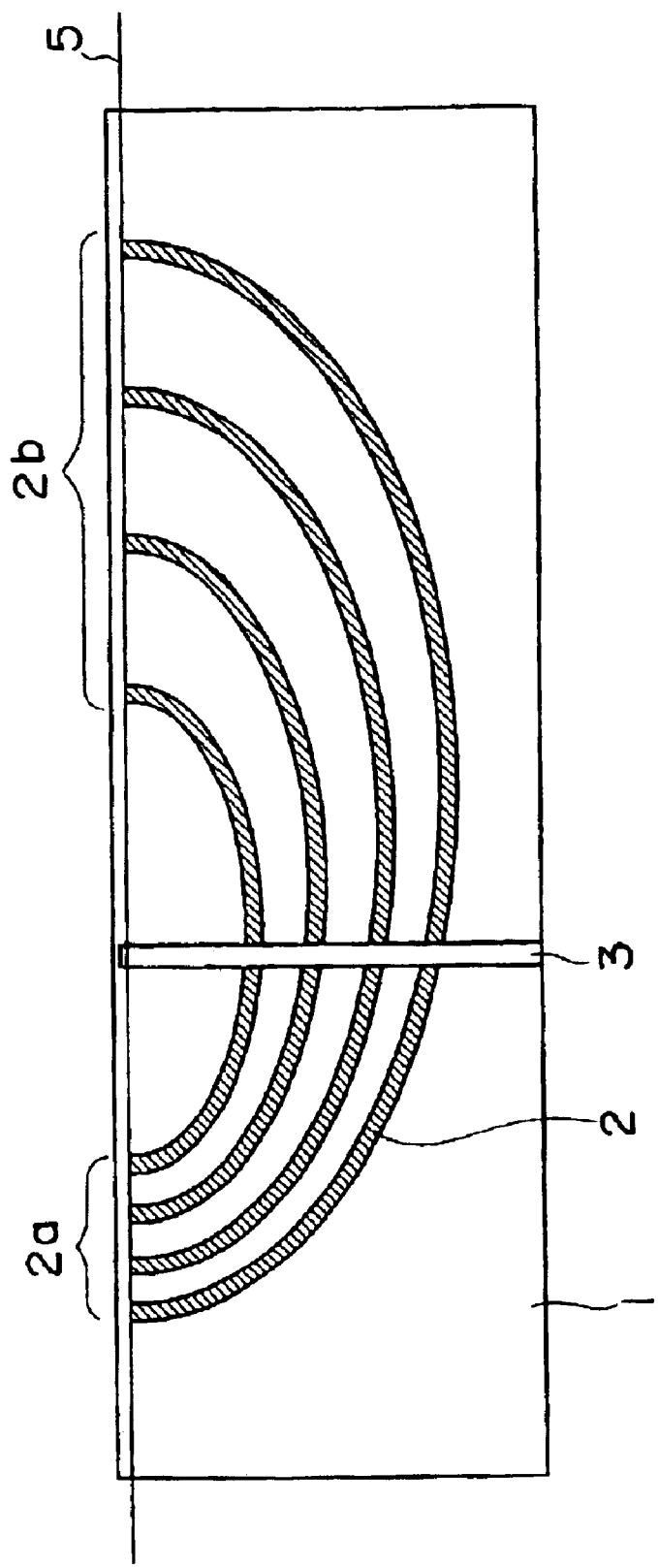
FIG. 2 is a plane figure of a second example of the state before filling of a curable resin in the invention seen from an upper side of a mold.

By adopting such the shape of a resin inlet, a curable resin can be introduced into a plurality of core parts at the same time as shown in FIG. 2, and time for producing a core part can be further shortened, and thus such the shape is effective in terms of cost.

And, in the invention, after a curable resin is introduced into the concave portion, a resin expelling member is inserted into the resin inlet 3 to a depth equal to the difference between a height of the convex portion of the master template (that is, a height of the core to be formed) and a height of the mold 1, whereby, an excess resin remaining in a resin inlet 3 is pushed out into a core groove, and distortion of a waveguide shape after completion of resin filling can be suppressed to a minimum.

In addition, in the invention, when a core (waveguide) is branched, it is preferable that a penetrated port is communicated with a whole branched mixing part (branching portion) of the concave portion, and that the penetrated port is utilized as a resin inlet, and start and end points of the aforementioned cut or punched waveguide is adopted as a resin outlet.

In addition, the aforementioned branched mixing part refers to a portion used for dividing the light evenly before a waveguide being ramified in a branched waveguide.

Thereby, since a filling time is shortened as compared with the case where a resin is injected from a start point side or an end point side of a waveguide as described above, it becomes possible to fill a resin more effectively. In addition, also in this case, it is preferable that, after filling of a curable resin into a concave portion, a resin expelling member is inserted into the resin inlet to a depth equal to the difference between the height of the convex portion of the master template (that is, the height of the core to be formed) and the height of the mold, whereby, a rate of filling can be improved as compared with the rate of a method depending only on capillary phenomenon.

FIG. 3 shows the state where a penetrated port is provided on the mixing part and used as a resin inlet to fill a curable resin, in the production of a waveguide having a branched core shape.

In the branched waveguide, a mixing part has a wider waveguide portion than a start point and an end point of the waveguide. Thus, there is a possibility that a curable resin for a core is not filled throughout a mixing part and air remains if the penetrated port used as a resin inlet is provided only on a small region of a mixing part. Then, by provision of a resin inlet 4 at such a position and a size that a core is divided into two as shown in FIG. 3, such the possibility can be reduced.

The position for dividing a core into two includes the mixing part, it is preferable that a resin inlet 4 occupies an approximate center of each core before and after ramification as shown in FIG. 3 and, as a size, it is preferable that a width has at least a span equal to a sum of widths of respective cores. In FIG. 3, a resin inlet 4 is provided at the same position and size as those of a mixing part.

In addition, in a step of forming the mold, formation of the resin inlet 3 in FIG. 2 or the resin inlet 4 in FIG. 3 may be performed either before or after cutting or punching of a mold. The resin outlet functions also as an air outlet at an initial stage of resin injection because a resin is not exited all the time in a resin introducing step as described above.

In order to fill a curable resin into a gap formed between a mold and a cladding substrate (concave portion of mold) by capillary phenomenon, it is required that a curable resin to be used has the sufficiently low viscosity so as to enable such the filling. Generally, since filling of a liquid uses capillary phenomenon, as a diameter of a tube grows smaller, a filling rate is reduced, and filling at a practical rate becomes impossible. Therefore, increase of a filling rate by capillary phenomenon becomes a theme upon actual use. As a method of increasing a filling rate, reduction in the liquid viscosity and reduction in pressure are effected. Usually, the viscosity is preferably 5000 mPa·s or smaller, more preferably 1000 mPa·s or smaller.

In addition, it is required that a refractive index of the curable resin after curing is higher than that of a polymer material constituting a cladding. Besides this, in order to reproduce an original shape harbored by a convex portion corresponding to a core part formed on a master template at a high precision, it is required that a volumetric change of the curable resin before and after curing is small. For example, reduction in a volume may be a cause for loss of waveguiding. Therefore, the curable resin has desirably as small volumetric change before and after curing as possible, and a volumetric change rate is preferably 10% or smaller, more preferably 6% or lower. In addition, it is preferable to avoid reduction in the viscosity by using a solvent because a volumetric change before and after curing is too large.

From the foregoing viewpoint, the viscosity of the curable resin is preferably in the range of 10 to 2000 mPa·s, more preferably in the range of 20 to 1000 mPa·s, further preferably in the range of 30 to 500 mPa·s. However, when the viscosity of the curable resin is reduced using a solvent, a volumetric change is large upon solidification, and there is a defect that an original shape can not be maintained at a high precision as described above. Therefore, it is necessary to select, as a curable resin for filling, a solvent-free material having as small a volumetric change as possible.

In addition, as described above, it is required that a refractive index of a cured material of a curable resin, which will be a core, is greater than that of the film substrate or the rigid substrate, and the difference between the refractive index of a clad and that of a core is preferably 0.02 or more, more preferably 0.05 or more. However, since many of film substrates with high adherability to a curable resin tend to have a refractive index of approximately 1.50, it is preferable that the refractive index of a curable resin is 1.52 or larger, more preferably 1.55 or larger.

As the curable resin, an ultraviolet ray-curable resin or a heat-curable resin is preferably used. As a material for the curable resin, epoxy series, polyimide series and acrylic series ultraviolet ray-curable resins are preferably used.

In addition, in this step, it is preferable that the whole system is placed under reduced pressure (approximately 0.1 to 200 Pa) in order to promote to fill the convex portion of the mold with the curable resin utilizing capillary phenomenon, wherein one end of a mold adhered to a film substrate is in contact with a curable resin that will become a core. Alternatively, in place of placing the whole system under reduced pressure, the system may be evacuated with a pump through a different end from one end contacting with the curable resin, of a mold, or a pressure may be applied at one end contacting with the curable resin.

Alternatively, in order to promote the filling, in place of the aforementioned reduction in pressure and increase a pressure or in addition to them, reduction in the viscosity of a curable resin by heating a curable resin contacting with one end of a mold is also an effective means.

In addition, when a penetrated port is provided midway in a waveguide and is adopted as a resin inlet in the invention, other optical elements may be introduced into a waveguide together with a curable resin for a core.

For example, in the case of the aforementioned branched core (waveguide), scattering of a branching ratio can be reduced even when a length of a waveguide is short, by arranging a diffusing plate 6 for evenly diffusing light into a resin inlet 4 (mixing part) as shown in FIG. 4, a plane figure seen from a mold side. In the invention, after a curable resin for a core is filled through a resin inlet 4, a polymer optical waveguide with a diffusing plate 6 inserted therein can be easily produced by inserting a diffusing plate 6 utilizing a resin inlet 4, and curing a core as is.

Examples for the diffusing plate 6 include plates utilizing hologram and grating. As a position at which a diffusing plate 6 is inserted, a position immediately before ramification of a branching portion (a position at which a mixing part begins) is preferable.

In addition, similarly, a polymer optical waveguide in which a light guiding plate is inserted can be easily produced by, after a core-forming curable resin is filled through a resin inlet, inserting through a resin inlet a light guiding plate, which has a length, in an inserting direction, equal to a height of the convex portion of the master template (that is, a height of the core to be formed) and has the same refractive index as that of the core, and curing the core as is.

-Step of Curing an Introduced Curable Resin-

In order to cure an introduced curable resin, an ultraviolet ray lamp, an ultraviolet ray LED, UV irradiating apparatus and the like are used. In addition, when a heat-curable resin is introduced, heating in an oven or the like is used for curing.

After curing, a mold is removed, a cladding layer is formed on the surface of a cladding substrate on which a core part is formed, and this is used as a polymer optical waveguide. Alternatively, as described above, the mold may be used as it is as a cladding layer and, in this case, it is not necessary to remove a mold, and a mold is utilized as a cladding layer as it is.

Examples of the material used as the cladding layer include the aforementioned film used as a cladding substrate, a layer obtained by coating and curing a curable resin (ultraviolet ray-curable resin, heat-curable resin), a polymer film obtained by coating and drying a polymer material solution and the like. When a film is used as a cladding layer, it is applied using and adhesive and, upon this, it is desirable that a refractive index of an adhesive is close to a refractive index of a film.

In order to obtain the difference between the refractive index of the cladding layer and that of the core, it is preferable that a refractive index of the cladding layer is less than 1.55, more preferably less than 1.52. In addition, it is preferable that a refractive index of a cladding layer is the same as that of the film substrate from a viewpoint of light containment.

-Step of Cutting a Cladding Substrate Along One Straight Line at One Time-

This step is a step of completing a polymer optical waveguide by cutting a cladding substrate on which a core and a cladding layer are formed as described above, along one straight line at one time, and forming a start point and an end point of a waveguide.

FIGS. 5A to 5G schematically show steps of producing a polymer optical waveguide of one embodiment in the invention utilizing capillary phenomenon. FIGS. 5A to 5D are steps of preparing a mold, and FIGS. 5E and 5F are steps of introducing a curable resin. In this method, as in FIG. 5C, a hole 14 (resin inlet) for introducing a resin is opened at an intermediate position of a mold 12, which is prepared by using a master template 10 having a convex portion 10a corresponding to a core part, in a waveguide longitudinal direction in a surface opposite to a surface adhered to a cladding substrate, so as to communicate with the concave portion and, as shown in FIG. 5E, a curable resin 16 to be a core is filled through this hole 14, and a curable resin 16 is expelled through both ends 13a (resin outlet) of a mold 13, whereby, the length of the concave portion to be filled can be substantially reduced to about a half, and time necessary for filling can also be reduced.

In order to complete production of an optical waveguide substrate by the aforementioned method, some edge face treatment is necessary for forming a start point and an end point of a waveguide. That is, in the aforementioned method, as shown in FIG. 5F, since a curable resin is expelled from an end of a mold 13, the resin solidifies with no defined shape. Then, in order to realize a specular surface having small loss as a start point and an end point of a waveguide and, as shown in FIG. 5G, a step of cutting at a position of a start point and an end point becomes necessary, and additionally a step of polishing may also become necessary. Here, numerical reference 15 shows a cladding substrate, numerical reference 17 shows a resin expelling member, numerical reference 18 shows a cladding layer and numerical reference 20 shows a dicing saw.

This step is necessary for all the parts having a start point or an end point of a waveguide and a step of layout exchange is needed every time. Subsequently, by aligning all start points and end points of a waveguide along the same single straight line and cutting them with a dicing saw along this same single straight line at one time, the troublesome precise cutting work can be performed by one time operation, and the other edge faces may be treated reasonably.

Further, even when a plurality of cladding substrates having a branched waveguide or a variously shaped waveguide are to be treated, the cladding substrates may be piled on each other so that the respective straight lines of each cladding substrate are aligned, and the cladding substrates are cut along the same straight line with a dicing saw at one time. Thereby, it becomes possible to perform the precise cutting work by one time operation, and necessary steps can be remarkably reduced.

Cutting along the same straight line at one time can be performed easily using a dicing saw, but cutting means is not limited to it.

As described above, according to the invention, by a simple method, an optical wavelength having a high precision core shape with small loss can be formed at a low cost, and a polymer optical waveguide which is excellent in large scale production and has high freedom degree can be obtained. In particular, also in a branched waveguide, a cutting step can be simplified and a necessary time for filling by capillary phenomenon can be shortened, whereby, the productivity can be enhanced.

Some embodiments of the invention will be described below.

A first embodiment of the invention provides a process for producing a polymer optical waveguide wherein all of one or a plurality of start points and all of one or a plurality of end points of a waveguide are uniformly aligned along a same single straight line, the process comprising the steps of: preparing a mold comprising a concave portion for forming a core; bringing a cladding substrate into close contact with the mold disposing a concave portion toward the substrate; filling the concave portion of the mold with a core-forming curable resin; curing the core-forming curable resin in the concave portion to form a core; and cutting a cladding substrate possessing a core part and a cladding layer thereon along the same single straight line.

A second embodiment of the invention provides a process for producing a polymer optical waveguide according to the first embodiment, wherein a plurality of cladding substrates possessing the core and the cladding layer thereon are piled on each other so that the respective straight lines of each cladding substrate are aligned, and the cladding substrates are cut along the same straight line.

A third embodiment of the invention provides a process for producing a polymer optical waveguide according to the first embodiment, which further comprises the steps of providing a penetrated port on a mold surface opposite to a mold surface adhered to the cladding substrate so that the penetrated port is communicated with the concave portion, filling the concave portion of the mold with a core-forming curable resin utilizing the penetrated port as a resin inlet and exposed concave portions at one or a plurality of start points and one or a plurality of end points of a waveguide as a resin outlet, and inserting a resin expelling member into the resin inlet to a depth equal to a difference between a height of the core to be formed and a height of the mold.

A fourth embodiment of the invention provides a process for producing a polymer optical waveguide according to the third embodiment, wherein a plurality of cladding substrates possessing the core and the cladding layer thereon are piled on each other so that the respective straight lines of each cladding substrate are aligned, and the cladding substrates are cut along the same straight line.

A fifth embodiment of the invention provides a process for producing a polymer optical waveguide according to the first embodiment, which further comprises the steps of, when a waveguide has a branched mixing part, providing a penetrated port on a mold surface opposite to a mold surface adhered to the cladding substrate so that the penetrated port is communicated with the whole branched mixing part of the concave portion, filling the concave portion of the mold with a core-forming curable resin utilizing the penetrated port as a resin inlet and exposed concave portions at one or a plurality of start points and one or a plurality of end points of a waveguide as a resin outlet, and inserting a resin expelling member into the resin inlet to a depth equal to a difference between a height of the core to be formed and a height of the mold.

A sixth embodiment of the invention provides a process for producing a polymer optical waveguide according to the fifth embodiment, wherein a plurality of cladding substrates possessing the core and the cladding layer thereon are piled on each other so that the respective straight lines of each cladding substrate are aligned, and the cladding substrates are cut along the same straight line.

A seventh embodiment of the invention provides a process for producing a polymer optical waveguide according to the fifth embodiment, wherein a diffusing plate is inserted into the resin inlet so that a leading edge of the diffusing plate is touched to the cladding substrate, in the step of filling the concave portion of the mold with a core-forming curable resin.

A eighth embodiment of the invention provides a process for producing a polymer optical waveguide according to the fifth embodiment, wherein a light waveguiding plate, which possesses a length, in an insertion direction, equal to a height of the core to be formed and a substantially same refractive index as that of the core, is inserted into the resin inlet so that a leading edge of the light waveguiding plate is touched to the cladding substrate, in the step of filling the concave portion of the mold with a core-forming curable resin.

A ninth embodiment of the invention provides a process for producing a polymer optical waveguide according to the first embodiment, wherein the mold is prepared by forming a mold-forming elastomer layer on a surface of a master template having a convex portion corresponding to a core part, removing the layer having a concave portion corresponding to the convex portion of the master template, and forming a side of the layer along a line substantially following at a distance from the straight line so as to expose a concave portion formed on the layer.

A tenth embodiment of the invention provides a polymer optical waveguide, which comprises a cladding substrate, a curved core on the cladding substrate, and a cladding layer on the curved core, wherein all of one or a plurality of start points and all of one or a plurality of end points of a waveguide are uniformly aligned along a same single straight line.

Further, in the invention, it is preferable that the cladding substrate is flat and, when the cladding substrate is flexible, it is preferable that the back of the flexible substrate is supported by a flat rigid body at a process of producing a polymer optical waveguide.

It is preferable that a refractive index of the cladding substrate is 1.55 or smaller, it is preferable that the cladding substrate is an alicyclic olefin resin film, and it is more preferable that the alicyclic olefin resin film includes a resin having a norborne structure in a main chain and having a polar group in a side chain.

It is preferable that a cladding layer to be formed on the surface of a cladding substrate on which a core part is formed as described later is formed by coating an ultraviolet ray-curable resin or a heat-curable resin and curing the resin. In addition, it is preferable that the cladding layer is formed by applying a cladding substrate with an adhesive having a refractive index close to that of the cladding substrate.

It is preferable that the mold-forming elastomer is obtained by curing a liquid curable silicone elastomer, and the surface energy of the mold is in the range of 10 to 30 mN/m. In addition, it is preferable that the Shore rubber hardness of the mold is in the range of 15 to 80°, and the root-mean-square (RMS) roughness Rq of the mold is 0.5 $\mu$m or smaller. Further, it is preferable that a thickness of the mold is in the range of 0.1 to 50 mm.

It is preferable that a curable resin for forming the core part is an ultraviolet ray-curable resin or a heat-curable resin, and it is preferable that the viscosity of the ultraviolet ray-curable resin or the heat-curable resin is in the range of 10 to 2000 mPa·s. In addition, it is preferable that a volumetric change when the ultraviolet ray-curable resin or the heat-curable resin is cured is 10% or less.

It is preferable that a refractive index of the cladding layer is the same as that of a cladding substrate, and it is preferable that a refractive index of a cured material of the ultraviolet ray-curable resin or the heat-curable resin, which will be a core, is 1.55 or larger. In addition, it is preferable that a difference between the refractive index of the cladding substrate and that of a core is 0.02 or more, and a difference between the refractive index of the cladding layer and that of a core is 0.02 or more.

EXAMPLES

The present invention will be specifically explained by way of Examples, but the invention is not limited to these Examples.

Example 1

After a thick resist (SU-8: manufactured by MicroChem Corp.) was coated on the surface of a Si substrate (diameter 6 inch) by a spin coating method, the substrate having the resist thereon was pre-baked at 80° C., irradiated with the light through a photomask, and developed to form a convex portion. Then, this was post-baked at 120° C., to prepare a master template for forming a core part of an optical waveguide having a branched concave portion. This optical waveguide is branched at 1:4 and, as shown in FIG. 3, has such a shape that a start point and an end point of a waveguide are aligned on the same straight line. A sectional-shape of a branched end is a regular square of 50 $\mu$m square, a length of a curved line part before and after branching is about 7.5 mm and they are arrayed at an interval of 250 $\mu$m at the end. In addition, a maximum width of a mixing part was 200 $\mu$m, lengths thereof were, in order from a shorter core part after branching, 19.75 mm, 20.00 mm, 20.25 mm and 20.50 mm.

After normal hexane was coated on this master template as a releasing agent, a heat-curable polydimethylsiloxane (PDMS) elastomer (SYLGARD 184: manufactured by Dow Corning Asia, Ltd.) was poured therein, heated at 120° C. for 30 minutes to be solidified, and removed to prepare a mold with 1 mm thickness having a concave portion corresponding to the convex portion having the cross-section of the regular square. This thickness was measured at a precision of an error of 1 μm or smaller using a non-contact laser displacement gauge. Further, the mold was cut with a cutter along a line 1 mm away from the straight line, which had all start points and all end points aligned thereon, so as to expose the concave portion, and a resin outlet was formed. The cutting was performed on the side opposite from the waveguide portion side. The surface energy of this mold was 20 mN/m, the Shore hardness was 45°, and the root-mean-square (RMS) roughness was 0.05 μm.

Then, this PDMS mold was cut and with a cutter at the same position and size as those of the mixing part, from a side opposite to a surface adhered to a cladding substrate, so as to communicate with the whole mixing part. This penetrated part was used as a resin inlet. This mold, and an Arton film (manufactured by JSR Corp., thickness: 188 μm, refractive index: 1.51), which is one size larger than the mold, vacuum-chucked to the surface of a planar plate glass were adhered when they were contacted.

In this state, when an epoxy series ultraviolet ray-curable resin (manufactured by NTT Advanced Technology Corporation) was introduced into the concave portion through a resin inlet by capillary phenomenon by pouring the ultraviolet ray-curable resin having the viscosity of 200 mPa·s onto the resin inlet of PDMS mold, the whole area of the concave portion was filled with the ultraviolet ray-curable resin in about 1 minute. After completion of filling, a pin jig having the same shape as that of the penetrated part of the mold, the leading edge of which is made of a resin of cured PDMS, was inserted so as to cover the resin inlet, then, a resin filled in the resin inlet was expelled, and surplus resin was expelled from the resin outlet. A fitting depth of this pin jig is structured such that only 50 μm remains, said 50 μm being the waveguide. That is, an insertion portion is designed so that the part has a length of a thickness of a mold from which 50 μm is subtracted, by matching a measured thickness of a corresponding PDMS mold. In addition, upon this, the positional deviation between a pin tip and a ceiling portion of a concave portion of a mold constituting a waveguide is presumed to be 5 μm or less.

In the above state, UV light having the light intensity of 50 mW/cm$^2$ was irradiated for 10 minutes through the PDMS mold to solidify the ultraviolet ray-curable resin. Then, the PDMS mold was removed, and thereby, a core part having the same shape as that of a convex portion of the master template was formed on the film of the Arton film. A refractive index of the core part was 1.54.

Further, an ultraviolet ray-curable resin (manufactured by NTT Advanced Technology Corporation) having a refractive index of 1.51 identical to that of the Arton film was coated on the surface of the Arton film, on which the core part was formed. Then, an Arton film was overlaid on the surface thereof and UV light having the light intensity of 50 mW/cm$^2$ was irradiated for 10 minutes to solidify the resin, and thereby a cladding layer having a thickness of 50 μm was formed.

Thereafter, a flexible polymer optical waveguide was formed by cutting at one time the cladding substrate, on which the core part and the cladding layer were formed, along the straight line on which a start point and end points of a waveguide are aligned. In addition, the above cutting was performed using a dicing saw (manufactured by Disco Corporation) under the condition of a rotation number of 20000 rpm and a feed rate of 2 mm/sec. This polymer optical waveguide could be used as a waveguide without polishing its side. In addition, when the light intensity was measured at each terminal end of branches, the ununiformity among branches was 10% or smaller.

Example 2

According to the same manner as that of Example 1, a master template for forming a core which has a cross-section of the regular square of 50 μm square was prepared. This core part structure has non-branched four waveguides and, as shown in FIG. 2, has a shape that a start point and an end point of a waveguide are aligned on the same straight line. A length of a waveguide is about 100 mm, and waveguides are arranged at a pitch of 250 μm.

A SUS plate having a thickness of 50 μm, on which a releasing agent was coated, was fixed at a position dividing a convex portion into approximately two parts in a longitudinal direction so as to cross the convex portion corresponding to the above 4 core parts. The plate was fixed not to be inclined. A releasing agent was coated on the whole and, thereafter, the PDMS resin used in Example 1 was poured. The resin was solidified by heating at 120° C. for 30 minutes, and removed to prepare a mold of a thickness of 3 mm having a concave portion corresponding to the convex portion having the cross-section of the regular square.

Then, by removing the plate, a resin inlet was formed on the PDMS mold. Further, the mold was cut with a cutter, along a line 1 mm away from the straight line, which had all start points and all end points aligned thereon, so as to expose the concave portion. The cutting line was on the side opposite from the waveguide portion side. Thus, a resin outlet was formed, and production of a mold was completed. This mold and the Arton film vacuum-chucked to the surface of the glass substrate were adhered when they were contacted.

In this state, when an ultraviolet ray-curable resin was introduced into a concave portion through a resin inlet by capillary phenomenon by pouring the ultraviolet ray-curable resin onto the resin inlet of the aforementioned PDMS mold as in Example 1, the ultraviolet ray-curable resin was filled in the whole area of the concave portion in about 2 minutes. After completion of filling, a SUS plate having a thickness of 50 μm was inserted into the resin inlet, to expel the resin filled in the resin inlet and to expel the surplus resin from the resin outlet. In addition, an insertion depth is defined by a jig so as to be equal to the length of a thickness of a mold minus 50 μm. The thickness of a mold is defined by measuring the thickness of a corresponding PDMS mold.

In the above state, when UV light having the light intensity of 50 mW/cm$^2$ was irradiated for 10 minutes through the PDMS mold to solidify the ultraviolet ray-curable resin and, then, the PDMS mold was removed, a core part having the same shape as that of the convex portion of the master template was formed on the surface of an Arton film. A refractive index of the core part was 1.54.

Further, after an ultraviolet ray-curable resin (manufactured by JSR Corp.) having a refractive index of 1.51 identical to that of the Arton film was coated on the surface of the Arton film, on which the core part was formed, the UV light having the light intensity of 50 mW/cm$^2$ was irradiated for ten minutes to solidify, and thereby a cladding layer having a thickness of 50 μm was formed.

Thereafter, as in Example 1, a flexible polymer optical waveguide was produced by cutting, at one time, the cladding substrate, on which core part and cladding layer were formed, along the straight line having a start point and an end point of a waveguide thereon.

In addition, the waveguiding loss of this polymer optical waveguide was 0.45 to 0.5 dB/cm.

Example 3

A flexible polymer optical waveguide was prepared according to the same manner as that of Example 2 except that a resin inlet was not provided on an upper portion of a mold as in FIG. 1 and a core part was formed by utilizing a part corresponding to a start point of a waveguide as a resin inlet and a part corresponding to an end point as a resin outlet.

Upon this, a time for filling the ultraviolet ray-curable resin into the whole area of a concave portion of a mold was 30 minutes. In addition, the waveguiding loss of a polymer optical waveguide was 0.35 to 0.38 dB/cm.

Example 4

A flexible polymer optical waveguide was prepared according to the same manner as that of Example 1 except that a diffusing plate (LSD sheet manufactured by Physical Optics Corporation in which a diffusing angle is 40 degree in a direction parallel to a substrate, and is 0.2 degree in a direction perpendicular to a substrate) was inserted into a part of a resin inlet at which a mixing part begins.

Regarding this polymer optical waveguide, the light intensively was measured at each end point, and the ununiformity among branches was improved to below 2%.

According to a process for producing a polymer optical waveguide of the invention, by a simple method, an optical waveguide having a high precision core shape which has small loss can be produced at a low cost, and further, a flexible polymer waveguide which is excellent in large scale production and has a high degree of freedom can be formed. In particular, also in a branched waveguide, a cutting step is simplified, and a necessary time for filling by capillary phenomenon is shortened, whereby, the productivity can be improved.

What is claimed is:

1. A process for producing at least one polymer optical waveguide wherein each of at least one polymer optical waveguide has at least one start point and at least one end point uniformly aligned along a same single straight line, the process comprising the steps of:
   preparing a mold comprising at least one concave portion for forming at least one core;
   bringing a cladding substrate into close contact with the mold disposing the at least one concave portion toward the cladding substrate;
   filling the at least one concave portion of the mold through a respective penetrated port along the length of the at least one concave portion with a core-forming curable resin;
   curing the core-forming curable resin in the at least one concave portion to form the at least one core; and
   cutting a cladding substrate possessing at least one core part and a cladding layer thereon along the same single straight line.

2. The process for producing at least one polymer optical waveguide according to claim 1, wherein a plurality of cladding substrates, each of the plurality of cladding substrates possessing the at least one core and the cladding layer thereon, are piled on each other so that the respective straight lines of each cladding substrate are aligned, and the cladding substrates are cut along the same straight line.

3. The process for producing at least one polymer optical waveguide according to claim 1, wherein the filling step includes providing at least one penetrated port on a mold surface opposite to a mold surface adhered to the cladding substrate so that the respective penetrated port is communicated with the at least one concave portion, filling the at least one concave portion of the mold with a core-forming curable resin utilizing the respective penetrated port as a resin inlet and exposed concave portions at the at least one start point and the at least one end point of a waveguide as resin outlets, and inserting a resin expelling member into the resin inlet to a depth equal to a difference between a maximum height of the at least one core to be formed and a height of the mold.

4. The process for producing at least one polymer optical waveguide according to claim 3, wherein a plurality of cladding substrates possessing the at least one core and the cladding layer thereon are piled on each other so that the respective straight lines of each cladding substrate are aligned, and the cladding substrates are cut along the same straight line.

5. The process for producing at least one polymer optical waveguide according to claim 1, which further comprises the steps of, when a waveguide has a branched mixing part, providing a penetrated port on a mold surface opposite to a mold surface adhered to the cladding substrate so that the penetrated port is communicated with the whole branched mixing part of the concave portion, filling the concave portion of the mold with a core-forming curable resin utilizing the penetrated port as a resin inlet and exposed concave portions at the at least one start point and the at least one end point of the waveguide as resin outlets, and inserting a resin expelling member into the resin inlet to a depth equal to a difference between a height of the core to be formed and a height of the mold.

6. The process for producing at least one polymer optical waveguide according to claim 5, wherein a plurality of cladding substrates possessing the at least one core and the cladding layer thereon are piled on each other so that the respective straight lines of each cladding substrate are aligned, and the cladding substrates are cut along the same straight line.

7. The process for producing at least one polymer optical waveguide according to claim 5, wherein a diffusing plate is inserted into the resin inlet so that a leading edge of the diffusing plate is touched to the cladding substrate, in the step of filling the concave portion of the mold with a core-forming curable resin.

8. The process for producing at least one polymer optical waveguide according to claim 5, wherein a light waveguiding plate, which possesses a length, in an insertion direction, equal to a height of the core to be formed and a substantially same refractive index as that of the core, is inserted into the resin inlet so that a leading edge of the light waveguiding plate is touched to the cladding substrate, in the step of filling the concave portion of the mold with a core-forming curable resin.

9. The process for producing at least one polymer optical waveguide according to claim 1, wherein a refractive index of the cladding substrate is 1.55 or less.

10. The process for producing at least one polymer optical waveguide according to claim 1, wherein the cladding substrate is an alicyclic olefin resin film.

11. The process for producing at least one polymer optical waveguide according to claim 10, wherein the alicyclic olefin resin film comprises a resin possessing a norborne structure in a main chain and a polar group in a side chain.

12. The process for producing at least one polymer optical waveguide according to claim 1, wherein the mold is prepared by forming a mold-forming elastomer layer on a surface of a master template having at least one convex portion corresponding to at least one core part, removing the layer having at least one concave portion corresponding to the at least one convex portion of the master template, and exposing the at least one concave portion on a side of the layer along the same single straight line aligning the at least one start point and the at least one end point.

13. The process for producing at least one polymer optical waveguide according to claim 1, wherein a surface energy of the mold is 10 to 30 mN/m.

14. The process for producing at least one polymer optical waveguide according to claim 1, wherein a Shore rubber hardness of the mold is 15 to 80°.

15. The process for producing at least one polymer optical waveguide according to claim 1, wherein a root-mean-square (RMS) roughness Rq of the mold is 0.5 µm or less.

16. The process for producing at least one polymer optical waveguide according to claim 1, wherein the mold is utilized as the cladding layer.

17. The process for producing at least one polymer optical waveguide according to claim 1, wherein the core-forming curable resin is an ultraviolet ray-curable resin or a heat-curable resin.

18. The process for producing at least one polymer optical waveguide according to claim 17, wherein a refractive index of a cured material of the ultraviolet ray-curable resin or the heat-curable resin is 1.55 or more.

19. At least one polymer optical waveguide, which comprises a cladding substrate, at least one curved core on the cladding substrate, and a cladding layer on the at least one curved core, wherein each of at least one polymer optical waveguide has at least one start point and at least one end point uniformly aligned along a same single straight line, the cladding substrate including an alicyclic olefin resin film.

20. The at least one polymer optical waveguide according to claim 19, which further comprises a branched mixing part.

* * * * *